Sept. 4, 1923.

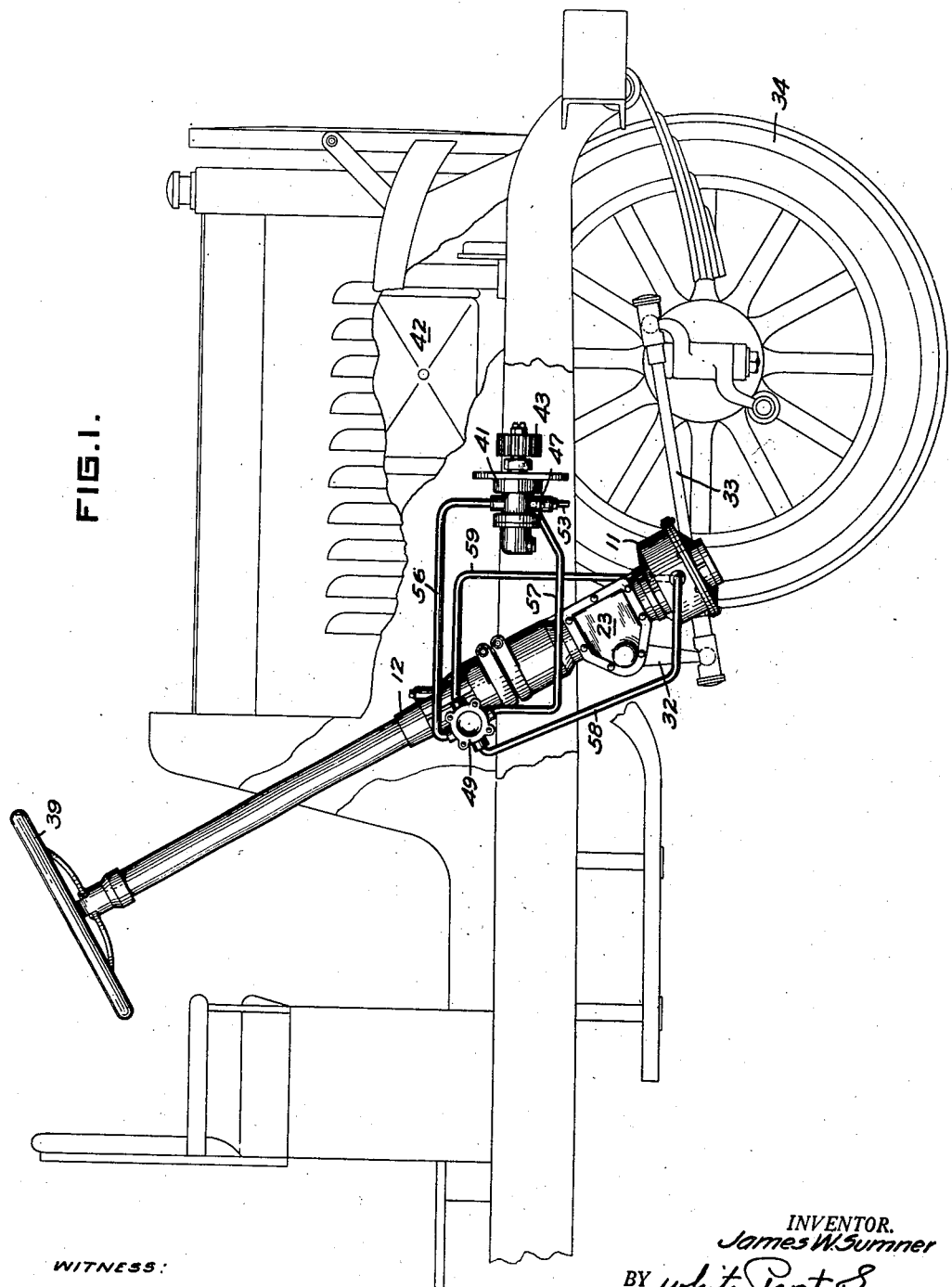

J. W. SUMNER

POWER STEERING MECHANISM

Filed Nov. 9, 1922    4 Sheets-Sheet 2

1,467,209

INVENTOR.
James W. Sumner.
BY White Post Evans
his ATTORNEYS.

WITNESS:
H. Sherburne

Sept. 4, 1923.
J. W. SUMNER
1,467,209
POWER STEERING MECHANISM
Filed Nov. 9, 1922    4 Sheets-Sheet 3
FIG.4.
FIG.9.
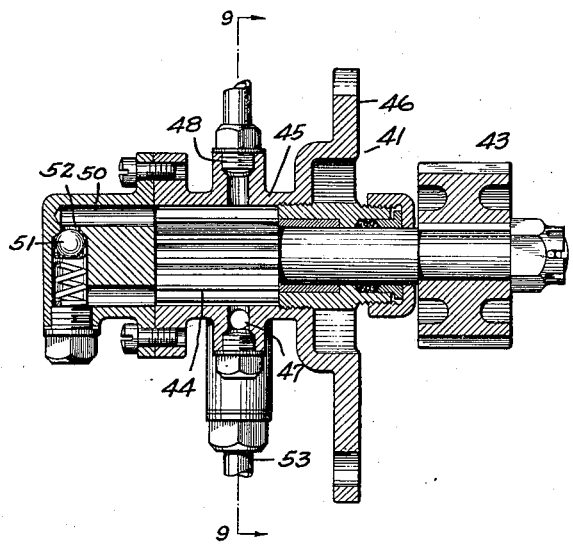
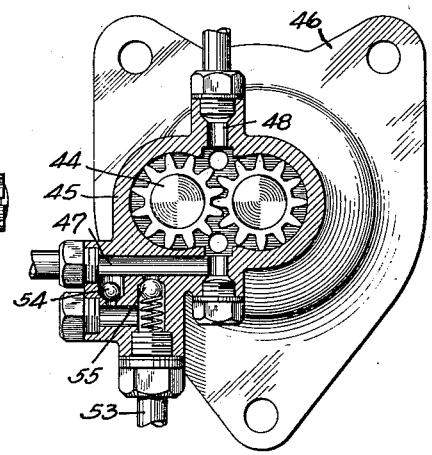
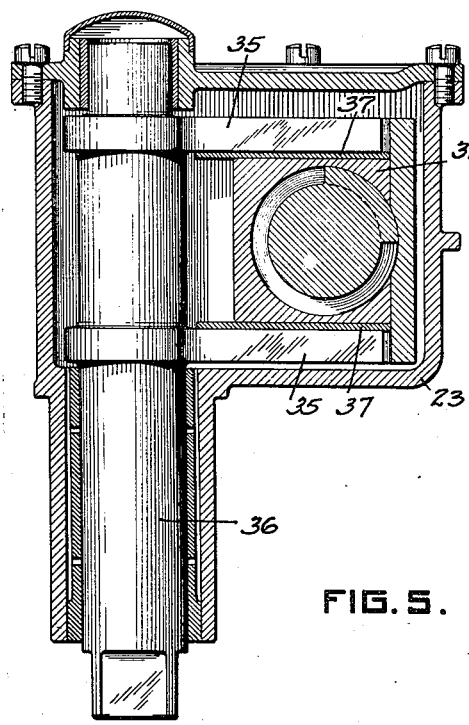
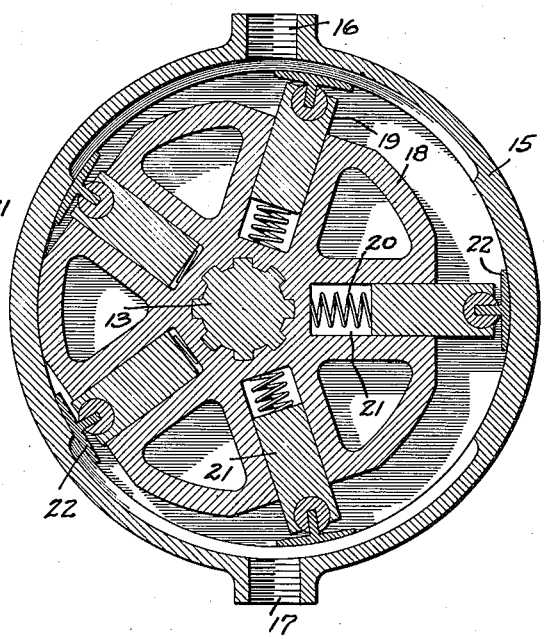
FIG.5.    FIG.6.
WITNESS:
H. Sherburne
INVENTOR.
James W. Sumner
BY White Prost Evans
his ATTORNEYS.

Sept. 4, 1923.　　　　　　　　　　　　　　　　　　　　　1,467,209
J. W. SUMNER
POWER STEERING MECHANISM
Filed Nov. 9, 1922　　　　4 Sheets-Sheet 4
FIG.7.　　　　　　　　FIG.8.
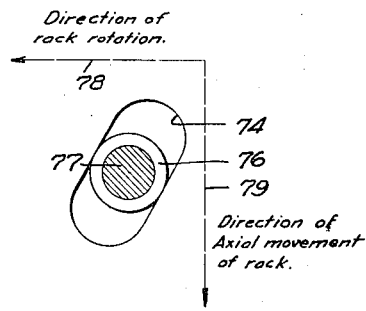
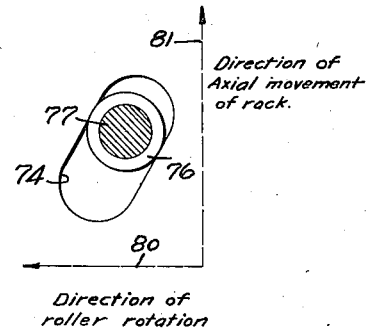
FIG.10.
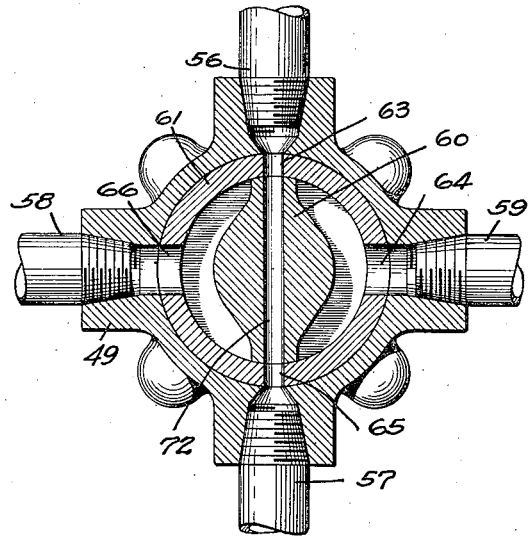
INVENTOR.
James W. Sumner Patented Sept. 4, 1923.

1,467,209

UNITED STATES PATENT OFFICE.

JAMES WAYNE SUMNER, OF LOS ANGELES, CALIFORNIA, ASSIGNOR TO EMORY WINSHIP, OF SAN FRANCISCO, CALIFORNIA.

POWER STEERING MECHANISM.

Application filed November 9, 1922. Serial No. 599,777.

*To all whom it may concern:*

Be it known that I, JAMES W. SUMNER, a citizen of the United States, and a resident of the city of Los Angeles, county of Los Angeles, in the State of California, have invented a new and useful Power Steering Mechanism, of which the following is a specification.

This invention relates to a mechanism for steering a vehicle, such as an automobile truck or the like, and more particularly to such a device that is arranged to be operated by a source of power manually controlled in response to a steering operation with a steering wheel or lever. The wheel or lever thus performs merely the control for the power that actually serves to move the steering mechanism. Thus in a heavy motor truck the driver is relieved from the burdensome physical strain needed to turn the front wheels of the vehicle; instead he is required simply to turn the steering wheel to the right or left, and he thereby causes actuation of a powerful agency capable, with any required degree of ease, of moving the drag line connected to the front wheels. One form of such a mechanism is described and claimed in a prior application, filed October 25, 1921, in my name, entitled "Motor vehicle steering apparatus" and having Serial Number 510,216.

While the apparatus disclosed in this prior application is capable of practicable operation, I have found that it is possible to simplify that structure very materially. It is thus one of the objects of my invention to provide a simple and inexpensive power steering mechanism.

In order that such a steering mechanism be readily adaptable for use in existing vehicles, it is essential that the change from a manually operated steering mechanism to a power operated one be readily accomplished, and it is thus another object of my invention to provide a power steering mechanism that is compact in arrangement and may readily be substituted for an ordinary steering wheel and column.

In my prior application I describe a scheme whereby the extent of movement of the steering wheel, in the process of steering, determines the extent of movement of the steering mechanism; in other words, the amount that the vehicle wheels are moved for steering is a function of the amount that the steering wheel is moved. There is thus substantially the same effect upon movement of the wheel as if there were a direct connection from the steering wheel to the vehicle wheels, as in existing well-known types of steering mechanisms. It is, however, another object of my invention to improve this mechanism in such a way that the movement of the steering wheel is followed substantially exactly by the movement of the various steering elements, so that the similarity of steering between the ordinary manual operation and the power operation described herein, is greatly enhanced. This is of great importance in order to insure that the driver will have immediately the same confidence in his steering as with the older types of manual operation.

My invention possesses other advantageous features, some of which, with the foregoing, will be set forth at length in the following description, where I shall outline in full that form of the invention which I have selected for illustration in the drawings accompanying and forming part of the present specification. Although I have shown in the drawings but one embodiment of my invention, I do not wish to be limited thereto, since the invention as expressed in the claims may be embodied in other forms also.

Referring to the drawings:

Figure 1 is a side view of the front portion of a vehicle equipped with a steering mechanism embodying my invention, with certain of the vehicle parts broken away to show the steering mechanism more clearly;

Fig. 4 is a section of one form of pump that may be utilized in connection with my invention, in order to supply the power for operating the mechanism;

Fig. 5 is a sectional view along the plane 5—5 of Fig. 2;

Fig. 6 is a sectional view along the plane 6—6 of Fig. 2, illustrating the construction of one form of hydraulic motor that may be utilized to operate the steering mechanism;

Figs. 7 and 8 are diagrams illustrating the operation of the device for following up the movement of the steering wheel by the movement of the motive power;

Fig. 9 is a cross section of the pump taken along plane 9—9 of Fig. 4; and

Fig. 10 is a cross section of the control valve taken along plane 10—10 of Fig. 3, but with the rotatable valve member in a different angular position.

Figures 2, 3:
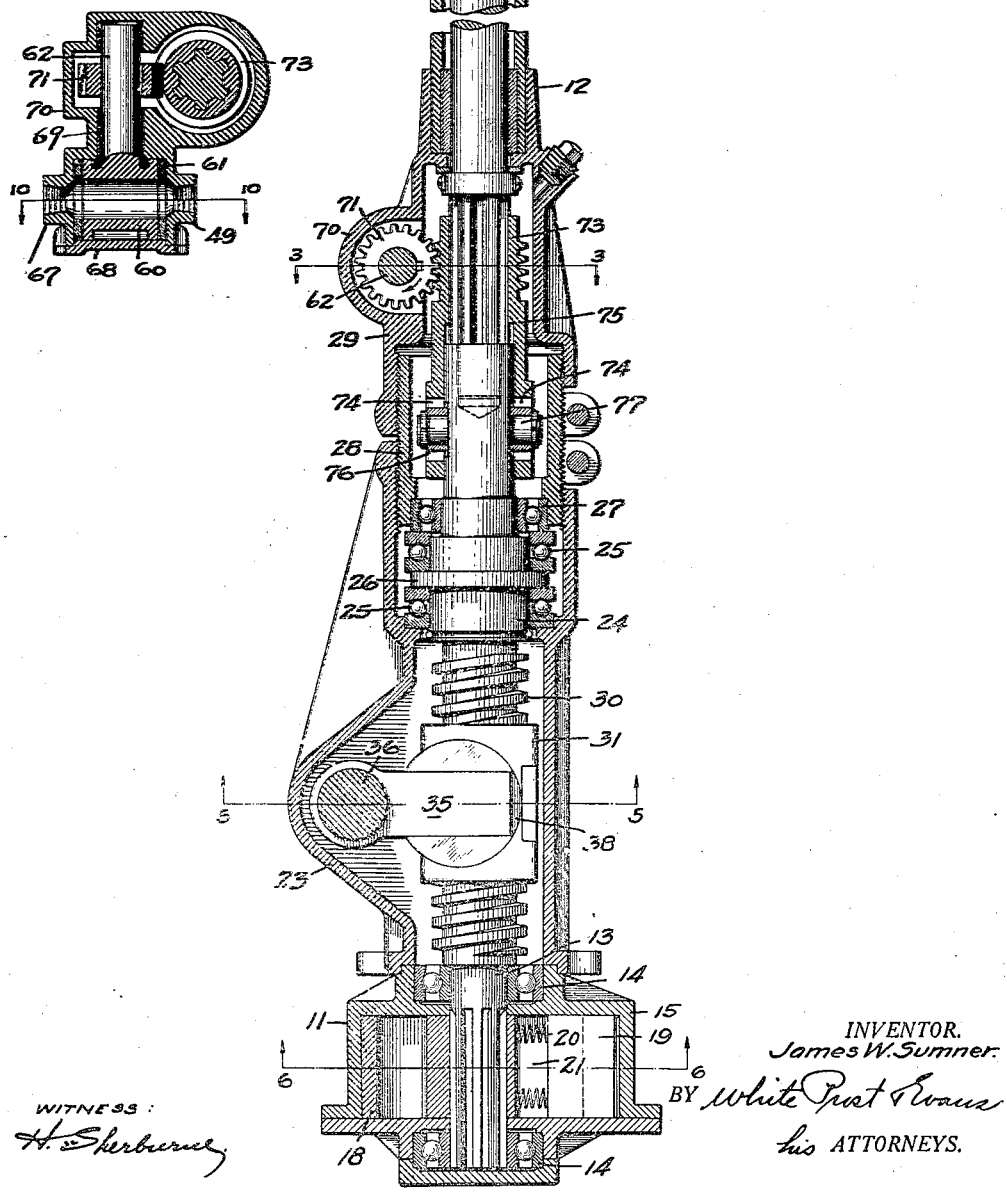
Fig. 2 is a longitudinal section through the steering mechanism shown in Fig. 1, the length of the steering column being somewhat reduced in order to save space.
Fig. 3 is a cross section of the steering mechanism of Fig. 2, taken along the plane 3—3 of Fig. 2.

In the present instance the motor 11 for exerting the requisite power to effect the steering is conveniently located at the base of the steering column 12. This column is preferably so arranged that it presents substantially the same appearance as a manually operated steering device, and in fact one of the advantages of my invention lies in the ease with which the manual device and the power device may be interchanged on a vehicle. The shaft 13 of the motor 11 is mechanically connected to the steering mechanism, and is supported preferably on ball bearings 14. In the present instance the motor 11 and the steering mechanism are shown as substantially identical with that described in my prior application. Thus the motor 11 is operated by fluid pressure although it is of course possible to substitute other types of motors. A fluid, such as oil, under pressure is made to circulate within the motor casing 15 by the aid of the ports 16 and 17, either of which may serve as an inlet or outlet port depending on the direction of rotation which it is desired to produce.

The operation of the motor 11 may best be understood from an inspection of Fig. 6, which shows that the casing 15 is arranged eccentrically with respect to the rotating member 18. In this rotor a number of movable radial vanes 19 are provided, urged toward the inner wall of the casing 15 by appropriate resilient devices, such as springs 20 at the bottom of the radial guideways 21 for the vanes 19. From the relative disposition of the parts shown in Fig. 6, it is evident that admission of fluid through the upper port 16 and its discharge through the lower port 17 causes fluid pressure to act against the radial vanes 19 in such a direction that they are rotated in a clockwise direction, in a manner entirely analogous to the operation of an ordinary water paddle wheel. A reversal of fluid flow, so that fluid enters through port 17 and is discharged through port 16, causes a corresponding reversal in the direction of rotation of the rotor.

The vanes 19 which serve as paddles are preferably constructed so as to be radially movable for the purpose of providing fluid tight spaces between these vanes and the inner wall of casing 15 at all times. In this way there is no other avenue of escape for the fluid than by rotating the vanes, and the efficiency of the motor is maintained at a high value. In order to provide as tight a connection as possible between the vanes and the casing 13, oscillatory shoes 22 are supported at the extremities of vanes 19, which shoes maintain a tight sliding joint with the inner surface of casing 15. Furthermore, I preferably employ oil for the operating fluid, and in this way the problem of lubrication of the various sliding elements is comparatively simple to solve.

The motor casing 15 is appropriately fastened in any well-known manner to the bottom of a hollow casing member 23 within which are accommodated some of the steering mechanism. This mechanism may include a shaft 24 splined to the shaft 13 of the motor. This shaft is appropriately supported against axial displacement, as by the aid of thrust ball bearings 25 acting against a collar 26 fastened to the shaft. For further supporting the shaft 24, a ball bearing 27 is provided, located in a member 28 which serves as a coupling between the casing member 23 and the support 29 which carries some of the control elements. The shaft 24 is provided with a threaded portion 30 which engages a nut 31. Thus rotation of shaft 24 by the motor 11 causes axial displacement of nut 31, and this displacement in turn actuates the steering arm 32 connected to the drag link 33 for canting the front wheels 34. The connection between the nut 31 and the steering arm 32 is most clearly illustrated in Fig. 5. A pair of crank arms 35 embrace the nut 31 and are made to rotate about the axis of shaft 36 to which they are rigidly connected, by the movement of nut 31. For effecting this result, a pair of flat discs 37 are seated in opposite sides of the nut 31, which discs are rotatable relatively to the nut, and have slots 38 formed in them to accommodate the crank arms 35. The mechanical connection between nut 31 and shaft 36 may of course take other forms. The steering arm 32 is operatively connected, in any appropriate manner, to the shaft 36.

The source of fluid pressure may conveniently comprise an oil pump 41 arranged to be driven from the engine 42 of the vehicle, as by the aid of the gear 43. The pump construction may best be understood from inspection of Figs. 4 and 9 which are sectional views of the complete device. The pump 41 is preferably of the rotary type, and utilizes a pair of intermeshing gears 44 enclosed within a fluid tight chamber formed in the pump casing 45. This casing is appropriately fastened to a stationary part of the vehicle by the aid of an apertured flange 46 fastened to the casing 45. The pump inlet port 47 is in this instance shown as located near the bottom of the casing 45, while the high pressure or outlet port 48 is shown near the top of the casing. These ports connect, through an appropriate controlling valve 49, to the motor ports 16 and 17 in order to drive the motor 11. In order to prevent the production of excessive pressures in the pump chamber or in the connecting pipes, a by-pass 50 from the high to the low side may be provided, normally blocked by a spring-pressed ball 51, operating on a valve seat 52. Upon the production of excessive pressure in the high pressure side, this ball is unseated by the pressure and permits the unimpeded flow of oil through the by-pass 50. Furthermore, a connection 53 is provided from an oil reservoir to the low pressure side of the pump for replenishing the oil supply due to leakage or the like. This connection is normally closed by a gravity seated ball 54, which when the pressure becomes too low in the pump is unseated and permits the oil from connection 53 to flow thereto. To insure against reverse operation of the pump 41 as for example when the engine back fires, a provision is made to connect the low pressure side to the reservoir connection 53 whenever the low pressure side has an abnormally high pressure. For this purpose another spring-pressed ball 55 is utilized which may be unseated by a sufficiently high pressure in the intake side and thereby permits a flow of oil back to the reservoir through connection 53.

The control valve 49 is connected, by pipes 56 and 57, with the pump 41, and by pipes 58 and 59 with the motor 11. This valve is carried on the casing member 29 near the steering column 12 and is so arranged that it controls the direction of movement of the motor 11, as well as the supply of fluid thereto. The valve 49 is shown most clearly in Figs. 3 and 10. It comprises a pair of relatively movable members 60 and 61, the member 60 being disposed on a shaft 62 so that it may be rotated. Member 61 is in the form of a cylindrical sleeve having four ports 63, 64, 65 and 66. A housing member 67 and a cover 68 serve to enclose the valve parts as well as to provide a bearing support for the operating shaft 62. The housing 67 also provides for connection for the pipes 56, 57, 58 and 59 to the four ports 63, 64, 65 and 66. The casing member 29 of the steering column is provided with appropriately formed brackets 70 to accommodate the bearing portion 69 of the housing 67. For rotating the shaft 62, a gear 71 keyed thereto may be provided.

The rotating member 60 is cut away at both sides so as to form, with the inner wall of the member 61, a pair of separate chambers, which serve as communicating passages between certain of the ports, depending upon the relative position of members 60 and 61. An aperture 72 extends through the member 60, so that in the central position shown in Fig. 10, there is a direct passage through this aperture from the high pressure pipe 56 of the pump 41 to the low pressure pipe 57. Thus in this position the pump is inactive to supply fluid to motor 11. Should the valve member 60 be rotated say in a clockwise direction to an extent sufficient to cause the right hand chamber to connect ports 63 and 66, and the left hand chamber to connect ports 64 and 65, fluid under pressure may flow through pipe 58 to the motor 11 and return by way of pipe 59, and ports 64 and 65 to the low pressure pipe 57 of the pump 41. Upon displacement of valve member 60 in the opposite direction, it is evident that the flow of fluid to the motor 11 will take place in the opposite direction, through pipe 59, motor 11, pipe 58, port 65, and pipe 57. In this instance the direction of rotation of the motor will be opposite to that produced before. It is thus seen that by proper operation of control valve 49, it is possible to operate the motor 11 in either direction.

The operation of valve 49 is effected by the aid of any appropriate device, such as a circular rack 73 which is splined to the handwheel shaft 40 so as to be movable but not rotatable relatively thereto. A handwheel 39 of any appropriate construction is fastened to shaft 40. This shaft is appropriately journaled in the steering column 12, and the arrangement is such that movement of the wheel to one side or the other causes actuation of the valve member 60 to one side or the other. Furthermore, the operation of motor 11 causes a return of the valve 49 to its central position after the shaft 24 has been turned an amount substantially equal to the amount that the wheel 39 has been turned. To effect this result, there is a mechanical connection between the member 73 that operates the valve, and the shaft 24. This connection is such that while shaft 24 is stationary, rotation of shaft 40 and, therefore, of the circular rack 73, will cause an axial displacement between this rack and the shaft, and will cause the rack to rotate the gear 71 in one or the other direction. While other types of mechanical movement may be used, I prefer to effect axial movement of rack 73 by the aid of an inclined plane acting between a stationary part of shaft 24 and the rack 73. Thus, one or more inclined grooves 74 may be cut in a sleeve 75 fastened to the rack 73 and encompassing the upper end of shaft 24. Within these inclined grooves are disposed rollers 76 rotating on pins 77 fastened to the shaft 24. This in effect forms a slot and pin connection between the sleeves 75 and the shaft 24. The action of the inclined grooves 74 and the rollers 76 to slide the rack up or down relative to shaft 40 may best be understood from a consideration of Figs. 7 and 8. If the shaft 40 is rotated say in a clockwise direction, as indicated by arrow 78, and if we assume roller 76 for the moment to be stationary, the rack must move downward, as indicated by arrow 79. The relative position of the groove and roller may now be somewhat like that shown in Fig. 8. The rack 73 is thus constrained to slide in this direction in order to permit the relative rotation between shafts 40 and 24.

It has been assumed of course that shaft 24 is stationary, but as soon as the rack 73 slides downwardly, it causes a clockwise rotation of valve member 60 from its central position. This in turn causes oil under pressure to flow through pipe 58 to motor 11 and back through pipe 59. The motor 11 is thus caused to rotate in a clockwise direction. When this occurs the shaft 24 and, therefore, rollers 76, move in a direction represented by arrow 80. The rollers thus act against the left hand edge of grooves 74, and they slide up on the rollers in the direction indicated by arrow 81. As soon as the movement of shaft 24 is substantially the same as the previous movement of shaft 40, the relative position of the grooves and rollers is that shown in Fig. 7, and the rack, and therefore the valve 49, are returned to neutral position. Upon movement of steering wheel 39 in a counterclockwise direction, the rack 73 is first moved upwardly to rotate member 60 also in a counterclockwise direction. This causes the motor 11 to rotate in this direction, and in so doing the rack 73 is moved downwardly to its neutral position by the aid of the rollers 76 and grooves 74.

Should the motor 11 fail to operate for any reason, such as failure of pressure or the like, the arrangement is such that manual operation of shaft 24 automatically follows. The shaft 40 is rotated until rollers 76 reach the limit of their travel up or down the grooves 74, and from that point on further rotation of shaft 40 results in rotation of shaft 24. In this instance, the rollers and the grooves serve as a direct mechanical and substantially rigid connection between the two shafts. Thus the motor 11 must respond to the movement of shaft 40 while rollers 76 are free to move up or down the grooves 74, or else the shaft 24 is moved directly by the handwheel. The form of mechanical connection described is a simple and effective expedient for obtaining these useful results.

I claim:

1. In a power steering gear for vehicles, a steering shaft, a motor for rotating the shaft, a manually operable device for controlling the motor, and a mechanical connection between the steering shaft and the manually operable device comprising a pair of members, one having an inclined plane, and the other a part adapted to slide along the plane, and means whereby the relative movement between the inclined plane and the cooperating part is limited.

2. In a power steering gear for vehicles, a steering shaft, a motor for rotating the shaft, of manually operable shaft coaxial with the steering shaft, a member for controlling the motor axially movable but nonrotatable with respect to the manually operable shaft, and a mechanical connection between the steering shaft and said member comprising a sleeve coaxial with the shafts and having an inclined groove, and a pin engaging the groove, the pin and sleeve being disposed one on the operating member and the other on the steering shaft.

3. In a power steering gear for vehicles, a steering shaft, a fluid pressure operated motor for rotating the shaft, a manually operable shaft coaxial with the steering shaft, a valve for controlling the motor, a member for moving the valve, said member being splined to the manually operable shaft, and a mechanical connection between the member and the steering shaft comprising a sleeve coaxial with the shafts and having an inclined groove, and a pin engaging the groove, the pin and sleeve being disposed one on the operating member and the other on the steering shaft.

4. In a power steering gear for vehicles, a pair of coaxially arranged shafts, a motor for rotating one of said shafts, means for manually rotating the other of said shafts, a steering mechanism connected to the motor driven shaft, a sleeve splined to one of the shafts and a slot and pin connection between the sleeve and the other shaft, the slot being inclined as regards the shaft axis.

5. In a power steering gear for vehicles, a pair of coaxially arranged shafts, a motor for rotating one of said shafts, means for manually rotating the other of said shafts, a steering mechanism connected to the motor driven shaft, a sleeve splined to one of the shafts, a slot and pin connection between the sleeve and the other shaft, the slot being inclined as regards the shaft axis, and means whereby the motor is controlled in response to the axial movement of the sleeve.

6. In a power steering gear for vehicles, a steering column, a steering shaft in said column, a motor connected to the bottom of the shaft, a manually rotatable shaft above the steering shaft and coaxial therewith, and means for controlling the motor comprising a member movable in a direction parallel to the longitudinal axis of the column, and means whereby the axial position of the member is determined by the relative angular position of the two shafts.

7. In a power steering gear for vehicles, a steering shaft, a motor for driving said shaft, a manually rotatable shaft coaxial with the steering shaft, and means for controlling the motor, comprising a member movable in a direction parallel to the longitudinal axis of the column, means for limiting the axial movement of this member to a comparatively small amount, and means whereby the axial position of the member is determined by the relative angular position of the two shafts.

In testimony whereof, I have hereunto set my hand.

JAMES WAYNE SUMNER.